United States Patent

[11] 3,623,993

| [72] | Inventor | Michael J. Pearson<br>Pleasanton, Calif. |
|------|----------|--------------------------------|
| [21] | Appl. No. | 29,895 |
| [22] | Filed | Apr. 20, 1970 |
| [45] | Patented | Nov. 30, 1971 |
| [73] | Assignee | Kaiser Aluminum & Chemical Corporation<br>Oakland, Calif. |

[54] ALUMINA DESICCANT FOR DRYING UNSATURATED ORGANIC GASEOUS COMPOUNDS
5 Claims, 2 Drawing Figs.

[52] U.S. Cl. ................................................. 252/194,
23/141, 117/100 B, 252/317, 252/463
[51] Int. Cl. ....................................................... C01f 7/02,
C09k 3/00
[50] Field of Search .......................................... 252/194,
317, 448, 463; 55/524; 210/502, 504; 23/141;
117/100 B

[56] References Cited
UNITED STATES PATENTS

| 2,983,687 | 5/1961 | Myers et al. ................. | 252/194 |
| 3,222,129 | 12/1965 | Osment et al. ................ | 23/141 |
| 3,226,191 | 12/1965 | Osment et al. ................ | 23/141 |
| 3,360,134 | 12/1967 | Pullen ........................ | 252/194 |
| 3,379,499 | 4/1968 | Moehl ........................ | 23/141 |

*Primary Examiner*—Richard D. Lovering
*Assistant Examiner*—Irwin Gluck
*Attorneys*—James E. Toomey, Paul E. Calrow, Harold L. Jenkins and Andrew E. Barlay

ABSTRACT: An active alumina composite characterized by having the capability of drying and simultaneously inhibiting polymerization of organic gaseous polymerization-susceptible compounds is provided. The novel composite comprises a transition alumina substrate having a substantially chi-rho and eta structure and an alkali-modified surface, the composite containing about 3-25 percent by weight of a compound having the empirical formula of $MAl(OH)_2CO_3$, where M is K or Na.

MICHAEL J. PEARSON
INVENTOR

BY Andrew E. Barlay
ATTORNEY 3,623,993

ALUMINA DESICCANT FOR DRYING UNSATURATED ORGANIC GASEOUS COMPOUNDS

BACKGROUND OF THE INVENTION

This invention relates to an active alumina desiccant composite capable of drying and simultaneously inhibiting polymerization of organic gaseous polymerization-susceptible compounds possessing carbon-carbon unsaturations. More particularly, it relates to an active alumina composite comprising a selectively calcined transition alumina substrate and an alkali-modified surface area wherein the substrate is characterized by a substantially chi-rho and eta structure, a surface area of at least 300 m.$^2$/g. and a moisture sorption capacity of at least 18 percent at 60 percent relative humidity and its capability of partial rehydration and wherein the surface area is characterized by an alkali-modified structure of the empirical formula $MA1(OH)_2CO_3$, where M is K or Na, and wherein the composite contains at least about 3 percent and up to 25 percent by weight of the $MA1(OH)_2CO_3$ compound, the composite being further characterized by an infrared absorption peak at 1520 cm.$^{-1}$ wherein the area below the peak is at least 14 and up to 70 percent of the area below the peak at 600 cm.$^{-1}$ which is characteristic for $Al_2O_3$.

Unsaturated gaseous organic compounds such as ethylene, propylene and butadiene are widely utilized in the preparation of polymers. These compounds are usually produced by the cracking of natural gas and petroleum hydrocarbons and during manufacture and storage become contaminated with water. The amount of water contained in such gases varies as the conditions of manufacture and storage do, but water in any amount is undesirable when these gases are utilized as chemical intermediates for the preparation of polymers. The presence of water during polymerization can deleteriously affect the rate of polymerization, decrease the efficiency and the service life of the polymerization catalyst. Thus, moist gases must be dried prior to their utilization for the preparation of polymers.

Drying of unsaturated gases such as ethylene, propylene, butadiene and the like is generally accomplished by contacting the gas with a desiccant, active aluminas being commonly used for this purpose.

While the active aluminas, in their role as desiccants for gases, have many desirable properties such as high water sorption capacity which is retained for a long time over a broad temperature range, and are readily regenerable after exhaustion, they also have an unfortunate propensity for inducing polymerization of gaseous compounds such as ethylene, propylene, butadiene and the like, having carbon-carbon unsaturation.

The unwanted polymerization of such unsaturated gaseous compounds, which is induced by contact with active aluminas, occurs even at relatively low drying temperatures and also during regeneration of the exhausted aluminas, since frequently regeneration is accomplished by using a portion of the dried gases as the regeneration medium.

The undesired polymer products which are formed appear to be of uncontrolled molecular weights, and their sorption on the surface of the alumina reduces their water sorption capacity. Further, the polymeric surface coating will plug the pores of the alumina which, in turn, causes further decrease in the sorptive capacity. When the polymer-coated alumina is regenerated at elevated temperatures, the polymeric materials carbonize and the regenerated alumina has a much lower sorption capacity due to the presence of carbon on the surface and in the pores. Removal of this carbon can only be accomplished at very high temperatures, which can deleteriously affect the physical structure of the alumina and, in addition, can cause other undesirable changes. Attempts to minimize or eliminate the aforesaid disadvantages associated with conventional drying when used to dry unsaturated gases like ethylene, propylene and butadiene, agents such as aluminas have been unsuccessful. It has now been discovered that the aforesaid and other disadvantages presented by prior art desiccants can be eliminated or substantially minimized by utilizing the active alumina composite of the present invention.

BRIEF SUMMARY OF THE INVENTION

An active alumina composite comprising a selectively calcined transition alumina substrate and an alkali-modified surface area is provided which unexpectedly and substantially inhibits the polymerization propensities of organic gaseous compounds having carbon-carbon unsaturations during drying. The substrate is characterized by its substantially chi-rho and eta structure, a surface area of at least 300 m.$^2$/g., a moisture sorption capacity of at least 18 percent at 60 percent relative humidity and capability of partial rehydration; the surface of the substrate is characterized by an alkali-modified structure of the empirical formula $MAL(OH)_2CO_3$, where M is K or Na, the composite containing at least about 3 percent and up to 25 percent by weight the $MAL(OH)_2CO_3$ compound and being further characterized by an infrared absorption peak at 1520 cm.$^{-1}$, wherein the area below the peak is at least 14 and up to 70 percent of the area below the peak at 600 cm.$^{-1}$, which is characteristic for $AL_2O_3$.

DETAILED DESCRIPTION OF THE INVENTION

Figure 1:
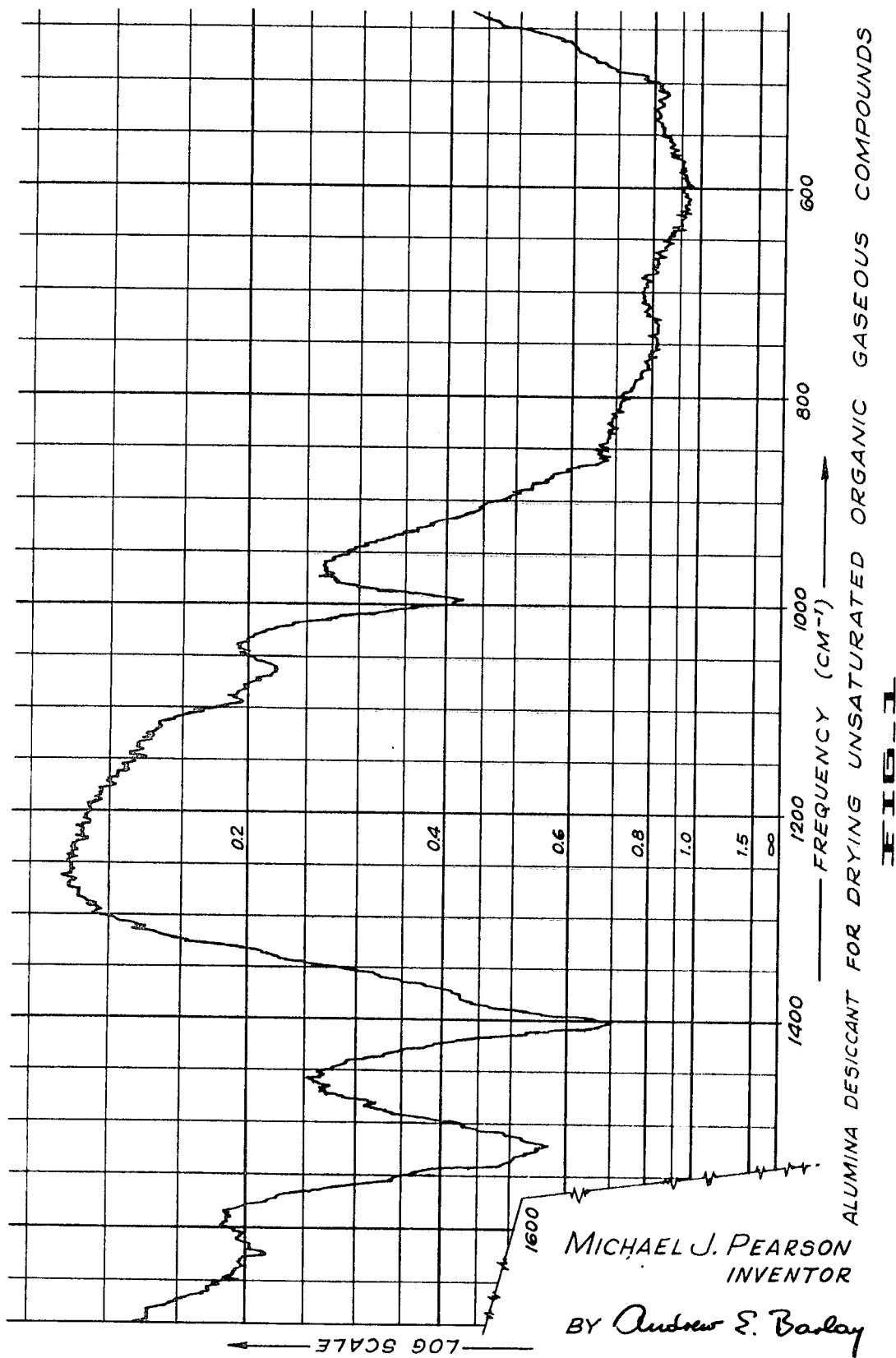
FIG. 1 shows the infrared absorption spectrum of the unique alumina composite of this invention. The peak appearing at 1520 cm$^{-1}$ and the area therebelow indicates the presence of about 20 percent of $MAL(OH)_2CO_3$ compound.

The present invention relates to an active alumina composite characterized by its unique ability to effect drying while simultaneously inhibiting polymerization of polymerization susceptible organic gaseous compounds having carbon-carbon unsaturations.

More particularly, it relates to a unique active alumina composite comprising a selectively calcined transition alumina substrate and an alkali-modified surface. The substrate is characterized by a substantially chi-rho and eta structure, a surface area of at least 300 m.$^2$/g., a moisture absorption capacity of at least 18 percent at 60 percent relative humidity and its capability of partial rehydration. The surface is characterized by an alkali-modified structure of the empirical formula $MA1(OH)_2CO_3$, where M is K or Na. The composite contains at least about 3 percent and up to 25 percent by weight of the $MAL(OH)_2CO_3$, and is further characterized by an infrared absorption peak at 1520 cm.$^{-1}$ wherein the area below the peak is at least 14 and up to 70 percent of the area below the peak at 600 cm.$^{-1}$, which is characteristic for $Al_2O_3$.

The alumina starting material used for making the composite can be obtained conveniently from the Bayer process, which produces alumina hydrates by the digestion of bauxite with caustic soda solution, followed by precipitation of the alumina from the resulting sodium aluminate solution. The precipitated alumina hydrates are usually filtered, washed free of impurities and dried.

In order to develop active sites on the alumina, which will permit its use as a desiccant, the alumina hydrates are thermally treated. The thermal treatment can be accomplished within a broad range of temperature, and is generally between 300°–800° C. The thermal treatment not only produces the active sites, but also develops surface area, strength properties and other desired physical characteristics.

It has been found that for the preparation of the active alumina composite of the invention, the alumina hydrates should be subjected to the so-called "flash calcination" method. In this calcination method, the alumina hydrate particles are subjected to a thermal treatment at temperatures in excess of 800° C. for time periods ranging from 10 seconds to less than 1 minute. A way to accomplish this rapid calcination is to introduce the alumina hydrate surrounded with a fuel-air mixture into a burner where the burning gases generate temperatures in excess of 1,000° C. The residence time of the alumina in the burner is usually less than 1 minute and the resultant product is quenched to room temperature. The alumina thus produced is a selectively calcined transition alumina possessing a substantially chi-rho and eta structure.

It is to be understood that any rapid calcination method, resulting in a product containing a substantial quantity of chi-rho and eta alumina, can be utilized for the preparation of the selectively calcined alumina substrate used in preparing the novel composite of the invention. For the purposes of this invention, the expression "substantial quantity" refers to a selectively calcined alumina containing chi-rho and eta alumina in an amount at least equivalent to 50 percent by weight of the selectively calcined alumina.

The selectively calcined alumina prepared according to the "flash calcination" method exhibits a surface area of at least 300 m.$^2$/g., a loss on ignition between 2 and 10 percent by weight, a static water sorption capacity of at least 18 percent at 60 percent relative humidity, and an average pore volume of at least 50 percent.

The selectively calcined alumina is capable of partial rehydration, and during rehydration the water of rehydration is chemically bonded therewith. This results in a partially rehydrated alumina of high strength properties and other desirable physical properties, for example, excellent regenerability and high abrasion resistance.

Generally, for drying purposes shaped alumina such as spheroids, balls or rods are utilized, for several reasons. Drying of gases is usually accomplished in drying towers or absorption column which are supplied with a substantial quantity of drying agent. The usual type of drying operation involves introduction of moist gaseous compounds at one end of the column or tower and removal of the dried gases after sufficient contact with the desiccant at the other end of the column. To provide sufficient contact with the desiccant, the column or tower is usually filled with the desiccant to a considerable height. If powdered alumina is used as the desiccant, the flow of the gases through the column is retarded and a considerable pressure drop is observed. This flow of gases can be considered as a plugged flow, which is undesirable for economic and fast drying operations. For this reason, granular or shaped active alumina desiccants are preferred for sorption columns.

When granular or shaped alumina is utilized in the columns, care must be taken to ensure that the granules and shapes are strong enough. Otherwise, particularly in the lower layers which carry the weight of the alumina, crumbling will occur, resulting in the formation of dust and powder and creating the above mentioned plugged flow, pressure drop, general loss in drying efficiency and loss in material during regeneration.

Shaping and rehydration can advantageously be combined, if desired. Spheres or nodules can be prepared by simultaneously adding ground, selectively calcined alumina and water in a nodulizer and the shapes formed by tumbling the alumina mass, occasionally adding more water until the desired shape is obtained.

The shaped particles can then be subjected to curing, which will develop the final strength properties in the alumina. The cured shapes are subsequently subjected to an activation treatment usually in excess of 100° C. for a time period of from about 60 to about 180 minutes to remove water trapped in the pores of the shapes. The shaped alumina thus prepared is suitable for use as the substrate in the manufacture of the unique composite of the invention.

To produce the composite of the present invention, the surface of the substrate is modified. One method of surface modification involves impregnation of the active alumina substrate by immersion in a solution containing a compound selected from the group consisting of $K_2CO_3$, $KHCO_3$, $Na_2CO_3$ and $NaHCO_3$.

In this type of surface modification treatment a carbonate containing aqueous solution is utilized, containing from about 30 grams/liter of $M_2CO_3$ or $MHCO_3$, where M is potassium or sodium. The upper limit of the concentration is usually determined by the solubility of the carbonate salt at the treatment temperature. It was found that when an aqueous potassium carbonate solution is utilized as the impregnating agent, $K_2CO_3$ concentrations of from about 50 grams/liter to about 500 grams/liter can be effectively utilized at temperatures of from about 20°–75° C.

The solubilities of $KHCO_3$, $Na_2CO_3$ and $NaHCO_3$ are about 224, 226 and 82.8 g./l. respectively at 25° C. in water and the upper limit of the concentration of the solutions used to impregnate the active alumina should be adjusted according to the treatment temperature. Higher concentrations of these salts are preferred in order to accomplish the impregnation within reasonable time periods and also to obtain the desired degree of surface modification.

The temperatures utilized in the impregnation treatment can vary from about 15° C. to about 100° C. Temperatures in the range 25°–80° C. were found to provide satisfactory results within a time period of from 30 minutes to about 180 minutes, lower temperatures being associated with longer time periods. The alumina, whether in powder, granular or shaped form, is admixed with the impregnating solution and agitated to obtain the desired intimate contact with the impregnating solution.

In another suitable method of impregnation, the selectively calcined alumina can be shaped and impregnated simultaneously. This is accomplished by admixing the selectively calcined alumina either in powder or in granular form with a concentrated solution of impregnating agent, followed by a tumbling operation to shape the alumina into, for example, spherical particles. A variation of this type of impregnation involves the gradual addition of the impregnating solution during the shaping process. Combinations of these processes are also useful.

The amount of $MAl(OH)_2CO_3$ compound formed on the surface depends on the concentration of the impregnating solution, on the temperature of the impregnation and on the subsequent activation treatment. A satisfactory composite is obtained when the selectively calcined alumina is modified to contain from about 3 percent by weight of $MAl(OH_2CO_3$. To obtain optimum water sorption capacity coupled with low polymerization rates, as well as good attrition resistance, the modified alumina should contain 5–25 percent by weight of $MAl(OH)_2CO_3$ after drying at 140° C. (M being potassium or sodium).

Following the impregnation process, the surface modified alumina is dried. Drying temperatures in excess of 100° C. and below about 200° C. can be utilized. The temperature range of from 105° to about 175° C. was found to be particularly suitable when the selectively calcined alumina was impregnated with $K_2CO_3$. The drying temperature is not critical, but the temperature and the time should be adjusted in a manner to allow removal of free water from the pores of the impregnated active alumina.

Subsequently, the modified alumina is subjected to an activation treatment at a temperature of from about 160° C. to about 350° C., preferably 200°–300° C., for a time period of from about 30 minutes to about 2 hours. This activation treatment can be coupled with the drying process by raising the temperature of the drying oven after the last traces of moisture are removed, or it can be accomplished in a separate step. The activation treatment will generally complete the surface modification of the active alumina for the purposes of this invention.

FIG. 1 shows the infrared absorption spectrum of an alumina composite according to the present invention wherein modification of the substrate was accomplished by the use of $K_2CO_3$.

The following nonlimiting examples further illustrate the subject of the present invention:

EXAMPLE I

Bayer Process alumina hydrate was selectively calcined by surrounding the alumina hydrate particles with a fuel-air mixture. The particles were conducted through a combustion zone, where a flame temperature of 1,650°–1,900° C. was maintained. The residence time of the particles in the combustion zone was less than 1 minute and subsequently they were quenched to room temperature by cooling with a stream of dry air. The selectively calcined, cooled particles were then ground to an average particle size of 0.05 mm. and shaped to spherical nodules in a nodulizer by the addition of water. The nodules had an average diameter of about 6 mm. and the following characteristics after nodulization, curing and activation at about 380° C. for 1hour: surface area–380 m.$^2$/g., average pore volume–0.51 ml./g., porosity–65 percent, average pore diameter in A–50, static sorption capacity at 60 percent rel. humidity–20 percent, crushing strength 22.7 kg.-force. The nodules were then impregnated at about 50° C. in a $K_2CO_3$ solution containing about 350 g./l. $K_2CO_3$ for 35 minutes. The impregnated nodules were dried at 160° C. for 90 minutes, followed by an activation treatment for 2 hours at 225° C. The activated, surface modified nodules were then subjected to infrared analysis by employing KBr pellet technique in a Perkin-Elmer Model 621 infrared spectrometer, resulting in the spectrum shown in FIG. 1.

The gaseous unsaturated compounds which can be dried without materially effecting polymerization during drying include those compounds which have one or more carbon-carbon unsaturations. The carbon-carbon unsaturation can be present as a double or as a triple bond. Representative examples of these organic gaseous compounds include: ethylene, propylene, butylene, butene, butadiene, acetylene. It should be understood that these compounds are only representative examples, and that unsaturated gases in addition to the ones described can be dried by the method of the invention.

Figure 2:
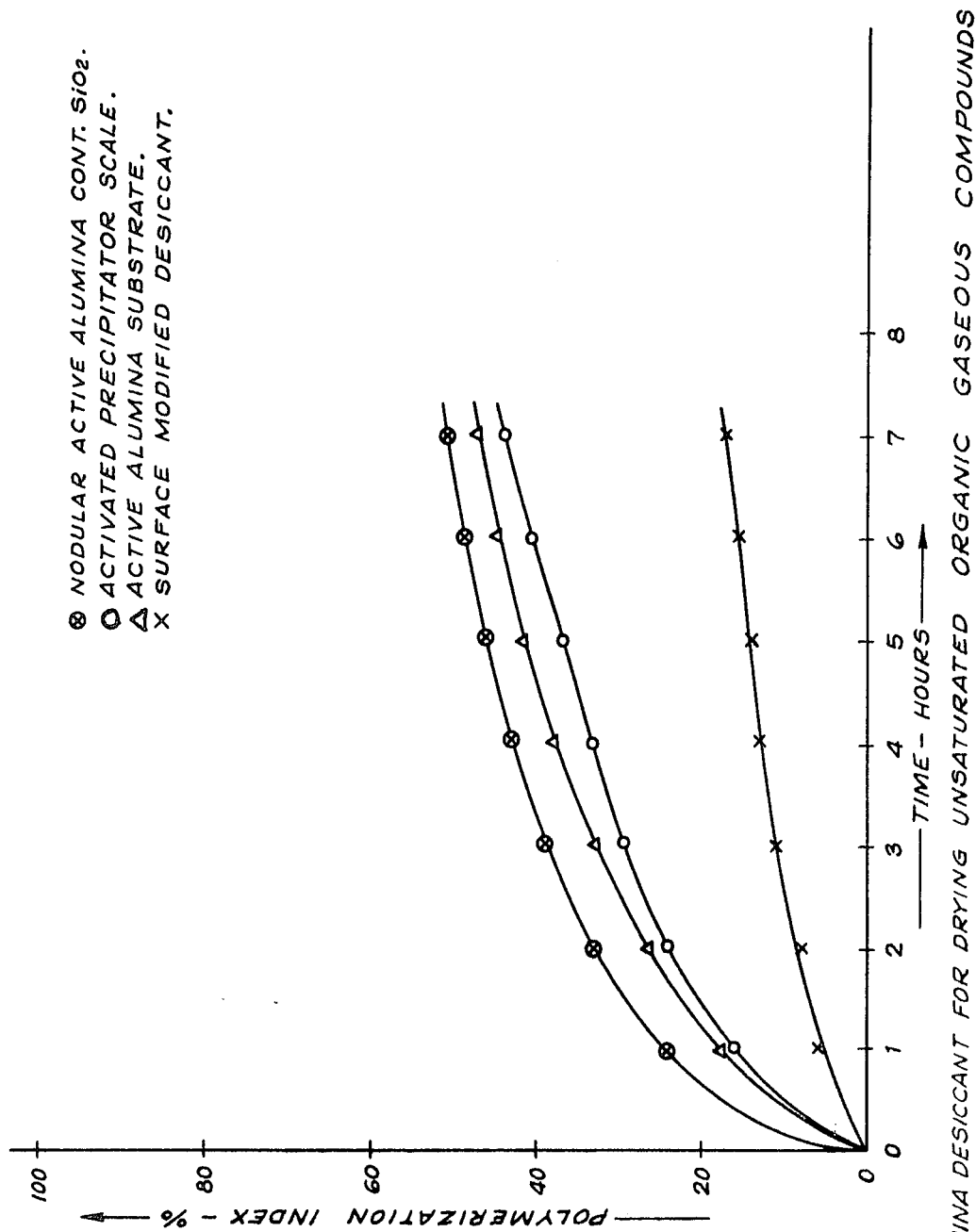
FIG. 2 shows graphically the polymerization of butadiene in the presence of commercial desiccants, and also in the presence of the alumina composite of the present invention.

FIG. 2 graphically compares polymerization activities of commercially available desiccants usually employed for drying gaseous unsaturated compounds and that of the surface modified active alumina of the present invention. The comparison tests were accomplished in the following manner:

20gram samples of the commercial desiccants and of the novel composite were each placed into 1 liter flasks. The flasks were evacuated, then heated to 350° C. for about 20 hours under vacuum, followed by cooling to 200° C. At this temperature, butadiene was introduced in an amount to obtain a butadiene pressure of about 0.5 atmospheres within the flask at 200° C. The butadiene-containing flasks were maintained at 200° C. for about 7 hours, pressure readings were taken at regular intervals and the pressure drop recorded. The pressure drop within the flasks indicates the degree of polymerization of the butadiene and is shown in FIG. 2. The ordinate of FIG. 2 shows the degree of pressure drop in percent, wherein the original pressure within the flask at 0 hour (0.5 atm.) was taken as 100 percent, the abscissa indicating the time in hours. The results of the comparison test are tabulated below and also are shown in FIG. 2.

Thus, it can be clearly observed that the active alumina composite of the present invention, when utilized in drying of an unsaturated organic gas such as butadiene, will very substantially inhibit polymerization of the gas. It can be seen from table II that the substrate utilized for surface modification causes considerable polymerization of butadiene.

The following table provides a comparison of polymerization indexes of novel composites within the scope of the present invention.

TABLE II

|  | Impregnating solutions used in treating substrate | | | | Untreated substrate |
| --- | --- | --- | --- | --- | --- |
|  | $K_2CO_3$ | $KHCO_3$ | $Na_2CO_3$ | $NaHCO_3$ |  |
| Polymerization index for butadiene (7 hr. 200° C.) | 12 | 21.3 | 27.5 | 31.0 | 42 |
| Sorptive capacity at 60% relative humidity | 19.9 | 18.8 | 19.2 | 19.2 | 19.0 |

Thus, it can be seen that the composites of the present invention are characterized by excellent drying and polymerization inhibiting properties. It can also be observed that the polymerization inhibiting effect is accompanied by no change in sorptive capacity.

The composites can be used in adsorption columns or drying towers for a considerable length of time. After exhaustion, i.e., saturation of the alumina with composite moisture, it can be readily regenerated in the usual manner. Regeneration temperatures utilized for the removal of adsorbed moisture are generally below that required for the decomposition of the $MAl(OH)_2CO_3$ compound. $HAl(OH)_2CO_3$ decomposes at about 370° C., while $NaAl(OH)_2CO_3$ decomposes at lower temperatures. For best results, it is recommended that the composite be regenerated at least a few degrees below the decomposition temperature. If decomposition occurs, the polymerization inhibiting characteristic of the desiccant changes and the efficiency and value of the desiccant is decreased.

The following table provides a comparison between the alumina composite of the present invention (A) and an alumina which was calcined at 400° C. for 4 hours and then nodulized, impregnated and activated in accordance with the procedures described above and designated as B.

TABLE I.—EFFECT OF DESICCANT ON POLYMERIZATION OF BUTADIENE UNDER STANDARDIZED CONDITIONS

[200° C. temperature, equal volumes, desiccant amounts and initial butadiene pressure]

| Desiccant type | Pressure drop, percent, hours of desiccant-butadiene contact | | | | | | | Polymerization index |
| --- | --- | --- | --- | --- | --- | --- | --- | --- |
|  | 1 | 2 | 3 | 4 | 5 | 6 | 7 |  |
| $KAl(OH)_2CO_3$ surface modified active nodular alumina [1] | 6 | 8 | 11 | 13 | 14 | 16 | 17 | 12 |
| Active alumina prior to surface modification [2] | 18 | 26 | 33 | 38 | 42 | 45 | 47 | 42 |
| Precipitator scale-activated [3] | 16 | 24 | 29 | 33 | 37 | 41 | 44 | 39 |
| Nodular active alumina containing $SiO_2$ [4] | 24 | 33 | 39 | 43 | 46 | 49 | 51 | 46 |
| No desiccant |  |  |  |  |  |  | 5 | 0 |

[1] $KAl(OH)_2CO_3$ surface modified active nodular alumina composite. The unmodified active alumina is prepared by flash-calcining Bayer hydrate followed by nodulization and rehydration and activation as hereinbefore described. The activated nodulus were immersed in a $K_2CO_3$ solution (350 g. $K_2CO_3$ liter) for 0.5 hour at 50° C., followed by drying at 160° C. for 2 hrs. and activation at 225° C. for 2 hrs. Surface area prior to impregnation 380 m$^2$/g.

[2] Active nodular alumina substrate. Prepared as the surface modified alumina but without subjecting it to surface modification. Surface area 380 m.$^2$/g., L.O.I. 6.0%.

[3] Precipitator scale alumina prepared by calcination of alpha-alumina trihydrate found on the walls of Bayer hydrate precipitators, granular, surface area 210 m.$^2$/g. after activation at 300–800° C. L.O.I. 6.8%.

[4] Nodular active alumina. Granular alumina, containing 6.3% by weight $SiO_2$, surface area 350 m.$^2$/g. L.O.I. 6.2%.

NOTE.—Polymerization index is the degree of polymerization in 7 hours of butadiene measured as the percentage drop in pressure caused by a desiccant under the above stated standard conditions. (A value of 5 is subtracted from the actual reading to correct for the polymerization of butadiene at 200° C. for 7 hours without desiccants.)

Table III

| Properties | A | B |
| --- | --- | --- |
| Average Pore Volume* ml./g. | 0.36 | 0.112 |
| Desiccant Capacity at 60% Rel. Humidity | 21 | 14 |
| Surface Area m.²/g. | 140 | 116 |
| Phases | chi-rho-eta | chi-gamma |

* Pore volume was measured by the standard mercury test at 27.240 kg. pressure (down to 30 A pore size)

EXAMPLE II

Active alumina granules were prepared from Bayer hydrate by selectively calcining the Bayer hydrate in accordance with the process described above in example I, to a loss on ignition of from about 3 -7 percent. The selectively calcined alumina was then shaped into granules as shown in example I, wherein the selectively calcined alumina comprising in excess of about 60 percent by weight chi-rho alumina, was agglomerated with water and cured at 70 °-99° C. to produce abrasion resistant alumina granules of spherical shape. The shapes were then activated at 400° C. to obtain an active alumina having a loss on ignition of about 6 percent by weight, a specific surface area of 350 m.²/g. and an average porosity of about 65 percent. This alumina was immersed into an aqueous solution containing 352 g./l. $K_2CO_3$. The solution containing the alumina was kept at 40 °-50° C. for 90 minutes; subsequently, the excess $K_2CO_3$ solution was removed by filtration and the impregnated shapes were dried at 140° C. for 2 hours. Following the drying, the impregnated alumina shapes were activated at 225° C. for a period of 60 -90 minutes. Infrared spectrum of the alumina composite indicated the presence of about 20 percent $KAl(OH)_2CO_3$.

20 grams of the shaped alumina composite were then placed into a 1-liter flask and the flask was evacuated, then heated to about 350° C. for 20 hours while under vacuum. Subsequently, the flask was cooled to 200° C. and filled by displacement to 0.5 atm. pressure with butadiene. The flask, containing the composite and the butadiene, was kept at 200° C. for 7 hours and the pressure drop was periodically checked. The pressure drop at the end of the 7-hour period was 17 percent (the starting 0.5 atm. was considered as 100 percent), indicating only a small degree of polymerization of the butadiene. A control flask containing butadiene but no desiccant was subjected to the same treatment, and self-induced polymerization was observed during this period, amounting to a 5 percent pressure drop. Thus, the composite induced only a 12 percent pressure drop (17-5), which is about three and a half times less than the pressure drop induced by commercial desiccants. (see table I).

After the 7 hours pressure drop test, the alumina composite was reactivated at 225°-250° C. for 1 hour and again subjected to the pressure drop test described above. No change in the percentage pressure drop was observed, which illustrates the good regenerability of the desiccant.

EXAMPLE III

Active alumina shapes, prepared in the same manner as described in example I, were immersed in an aqueous solution containing 220 g./l. $Na_2CO_3$. The admixture of alumina granules and $Na_2CO_3$ solution was kept at 60 °-65° C. for a period of 180 minutes, followed by removal of the excess $Na_2CO_3$ by filtration. The wet alumina granules impregnated with $Na_2CO_3$ were dried at about 140 °-150° C. for 2 hours, followed by an activation treatment at 230° C. for 1 hour. The active alumina composite contained 15 percent by weight of $NaAl(OH)_2CO_3$ as determined by differential thermal analysis.

After the 7 hours pressure drop test, using butadiene, the active alumina composite was regenerated by a thermal treatment at 220 °-230° C. for 1 hour. The aforedescribed pressure drop test was repeated several times with little or no change in the pressure drop characteristics of the desiccant, indicating long service life coupled with good regenerability.

The pressure drop test, as described in the above examples, was repeated using the novel composites of the invention with ethylene, propylene and butene in place of butadiene at 300° C. for a period of 18 hours. No significant pressure drop was observed. In contrast, commercial desiccants induced polymerization which was indicated by a pressure drop of about 14-20 percent within the 18 hour period.

Having thus described the invention, what is claimed is:

1. A shaped active alumina composite having the capability of simultaneously drying and inhibiting polymerization of polymerization-susceptible organic gaseous compounds containing carbon-carbon unsaturations which comprises:

a selectively calcined transition alumina substrate having a substantially chi-rho and eta structure, a surface area of at least 300 m.²/g., a water sorption capacity of at least 18 percent at 60 percent relative humidity, and capability of partial rehydration, the surface of the substrate having an alkali-modified structure of the empirical formula $MAl(OH)_2CO_3$ where M is selected from the group of K and Na; said composite containing at least about 3 percent and up to about 25 percent by weight of $MAl(OH)_2CO_3$, and being further characterized by an infrared absorption peak at 1520 cm$^{-1}$, wherein the area below the peak is at least about 14 and up to about 70 percent of the area below the peak at 600 cm$^{-1}$ characteristic for $Al_2O_3$.

2. The composite of claim 1, wherein the said $MAl(OH)_2CO_3$ content of the composite is of from about 5 up to about 25 percent by weight.

3. The composite of claim 1, wherein the chi-rho and eta content is at least 50 percent by weight of the substrate.

4. The composite of claim 1, wherein the $MAl(OH)_2Co_3$ compound is $KAl(OH)_2CO_3$.

5. The alumina composite of claim 1 wherein the $MAl(OH)_2CO_3$ compound is $NaAl(OH)_2CO_3$.

UNITED STATES PATENT OFFICE
CERTIFICATE OF CORRECTION

Patent No. 3,623,993          Dated November 30, 1971

Inventor(s) Michael J. Pearson

It is certified that error appears in the above-identified patent and that said Letters Patent are hereby corrected as shown below:

Column 2, line 13, "MAL" should be -- MAI --;

Column 2, line 15, "MAL" should be -- MAI --;

Column 2, line 21, "Fig.!1" should be -- Fig. 1;

Column 2, line 24, "MAL" should be -- MAI --;

Column 2, line 46, "MAL" should be -- MAI --;

Column 4, line 35, "$(OHO_2$" should be -- $(OH)_2$ --; and

Column 6, line 38, "HAI" should be -- KAI --.

Signed and sealed this 9th day of May 1972.

(SEAL)
Attest:

EDWARD M. FLETCHER, JR.          ROBERT GOTTSCHALK
Attesting Officer                Commissioner of Patents